US012650497B2

(12) United States Patent
Takashima et al.

(10) Patent No.: US 12,650,497 B2
(45) Date of Patent: Jun. 9, 2026

(54) MEMS-BASED HYBRID BEAM STEERING DEVICE FOR LIDAR

(71) Applicant: Arizona Board of Regents on Behalf of the University of Arizona, Tucson, AZ (US)

(72) Inventors: Yuzuru Takashima, Tucson, AZ (US); Brandon Hellman, Tucson, AZ (US); Joshua Rodriguez, Tucson, AZ (US); Youngsik Kim, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 1162 days.

(21) Appl. No.: 17/263,023

(22) PCT Filed: Jul. 29, 2019

(86) PCT No.: PCT/US2019/043969
§ 371 (c)(1),
(2) Date: Jan. 25, 2021

(87) PCT Pub. No.: WO2020/023969
PCT Pub. Date: Jan. 30, 2020

(65) Prior Publication Data
US 2021/0231781 A1    Jul. 29, 2021

Related U.S. Application Data

(60) Provisional application No. 62/703,918, filed on Jul. 27, 2018.

(51) Int. Cl.
G01S 7/481    (2006.01)
G01S 7/484    (2006.01)
G01S 17/10    (2020.01)

(52) U.S. Cl.
CPC .......... G01S 7/4817 (2013.01); G01S 7/4814 (2013.01); G01S 7/4816 (2013.01); G01S 7/484 (2013.01); G01S 17/10 (2013.01)

(58) Field of Classification Search
CPC .... G01S 7/4814; G01S 7/4816; G01S 7/4817; G01S 7/484; G01S 17/10; G02B 26/0816;
(Continued)

(56) References Cited

U.S. PATENT DOCUMENTS 6,166,744 A * 12/2000 Jaszlics ................... G06T 17/00
345/629
6,243,189 B1 * 6/2001 Ribes ................... G02B 26/105
359/201.1
(Continued)

FOREIGN PATENT DOCUMENTS

WO    2016097409    6/2016
WO    2017205171    7/2018

OTHER PUBLICATIONS

Sweeney, David, "Moving two stepper motors in a Raster Pattern", Nov. 19, 2017, mathworks.com, pp. 1-2 (Year: 2017).*
(Continued)

*Primary Examiner* — Yuqing Xiao
*Assistant Examiner* — Zhengqing Qi
(74) *Attorney, Agent, or Firm* — Bond, Schoeneck & King, PLLC; George R. McGuire

(57) ABSTRACT

A LiDAR system that uses a MEMS-based scanning mirror that reflects pulsed light generated by a laser. The scanning mirror reflects the light through a lens system which collimates the light and allows its transmission to a digital micromirror device that steers the light to different locations corresponding to different orders towards an object to be detected. A photodiode, operational amplifier, timing chip and processing device then receive and process the light
(Continued)

signal and generate a control sequence to synchronize timing of movement of the MEMS-based scanning mirror and the digital micro mirror device.

17 Claims, 12 Drawing Sheets

(58) Field of Classification Search
CPC ... G02B 26/0833; G02B 26/10; G02B 26/105
See application file for complete search history.

(56) References Cited

U.S. PATENT DOCUMENTS

| | | | |
|---|---|---|---|
| 10,031,214 B2 | 7/2018 | Rosenzweig et al. | |
| 2008/0056723 A1* | 3/2008 | Giles ................... | H04B 10/118 |
| | | | 398/118 |
| 2013/0250385 A1* | 9/2013 | Wolters ................ | G03F 7/7065 |
| | | | 359/201.1 |
| 2016/0041523 A1* | 2/2016 | Ashrafi .............. | G02B 26/0833 |
| | | | 359/9 |
| 2017/0176338 A1* | 6/2017 | Wu .................... | G01N 21/6428 |
| 2017/0328989 A1* | 11/2017 | Bartlett .................. | G01S 17/42 |
| 2018/0132782 A1* | 5/2018 | Wood .................. | A61B 5/0079 |
| 2019/0075281 A1* | 3/2019 | Hall ...................... | G01S 7/4814 |

OTHER PUBLICATIONS

International Search Report and Written Opinion of PCT Application No. PCT/US2019/043969 dated Dec. 5, 2019, 10 pages.

* cited by examiner

| | |
|---|---|
| Non-Amplified Voltage Difference | 31.2 mV |
| Amplified Voltage Difference | 294.0 mV |
| AV (Gain) | +9.42 |
| Y Rise Time | 0.40 ns |
| Y Settle Time | 2.24 ns |
| Delay from Trigger | 1.70 ns |
| B Rise Time | 0.52 ns |
| B Settle Time | 2.96 ns |
FIGURE 5A
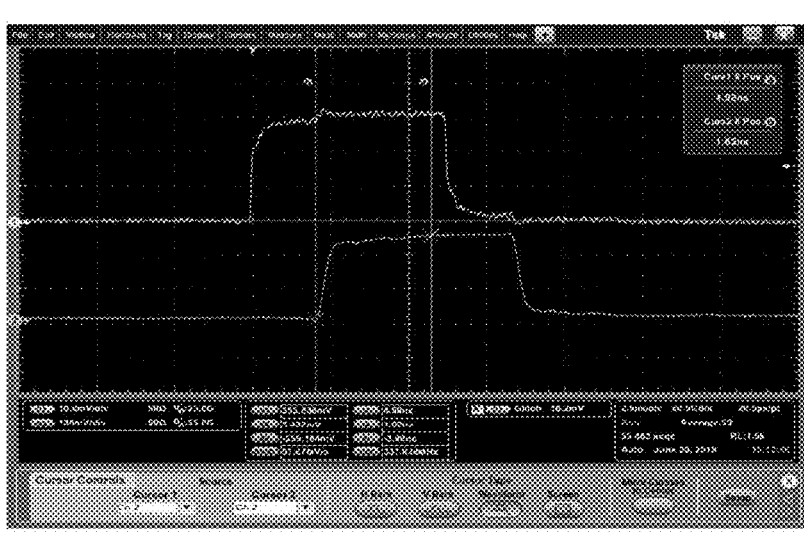
FIGURE 5B
10 x 10 Raster Scan
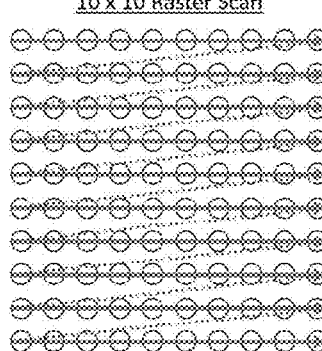
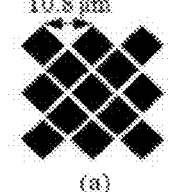
10.8 μm
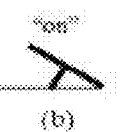 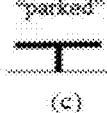 
(a)     (b)     (c)     (d)
FIGURE 6                              FIGURE 7

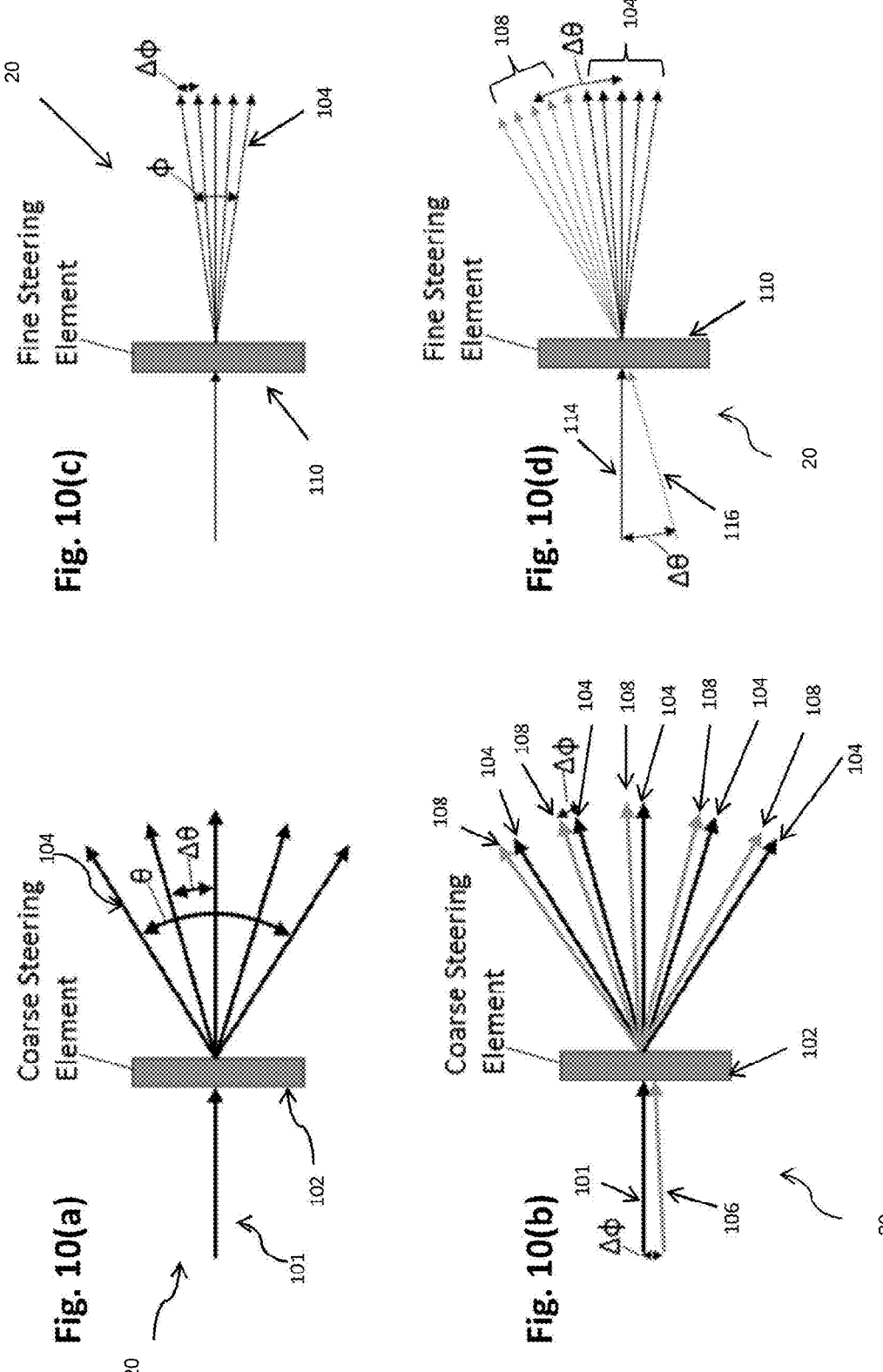

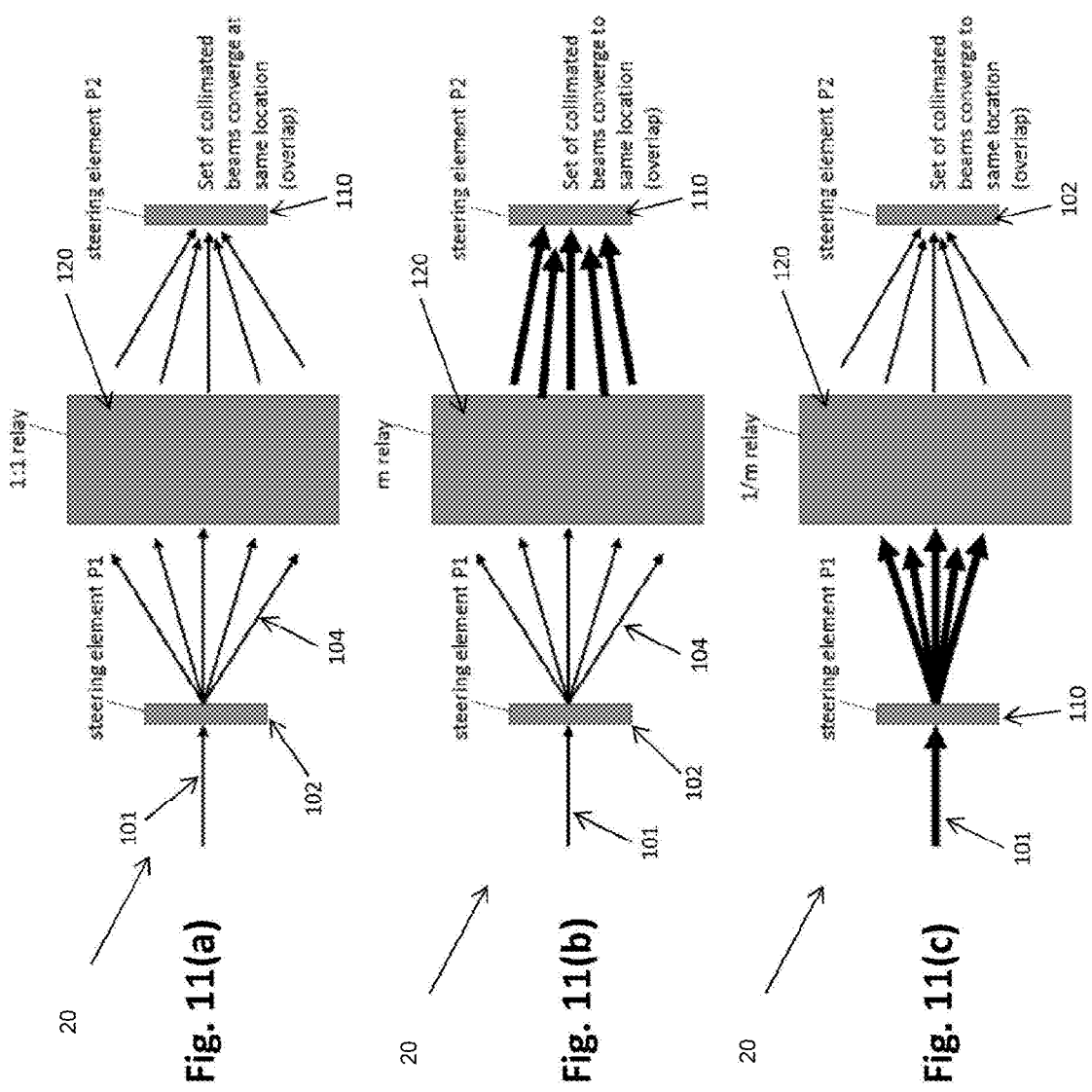

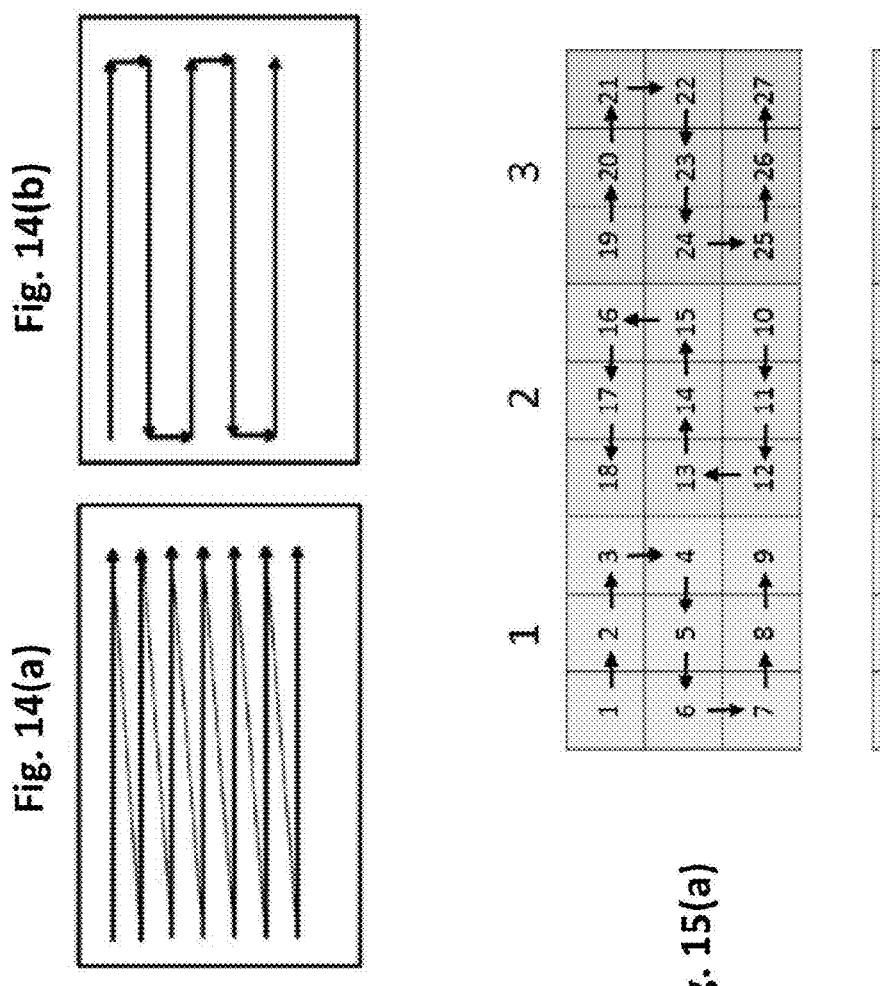

Figure 16:
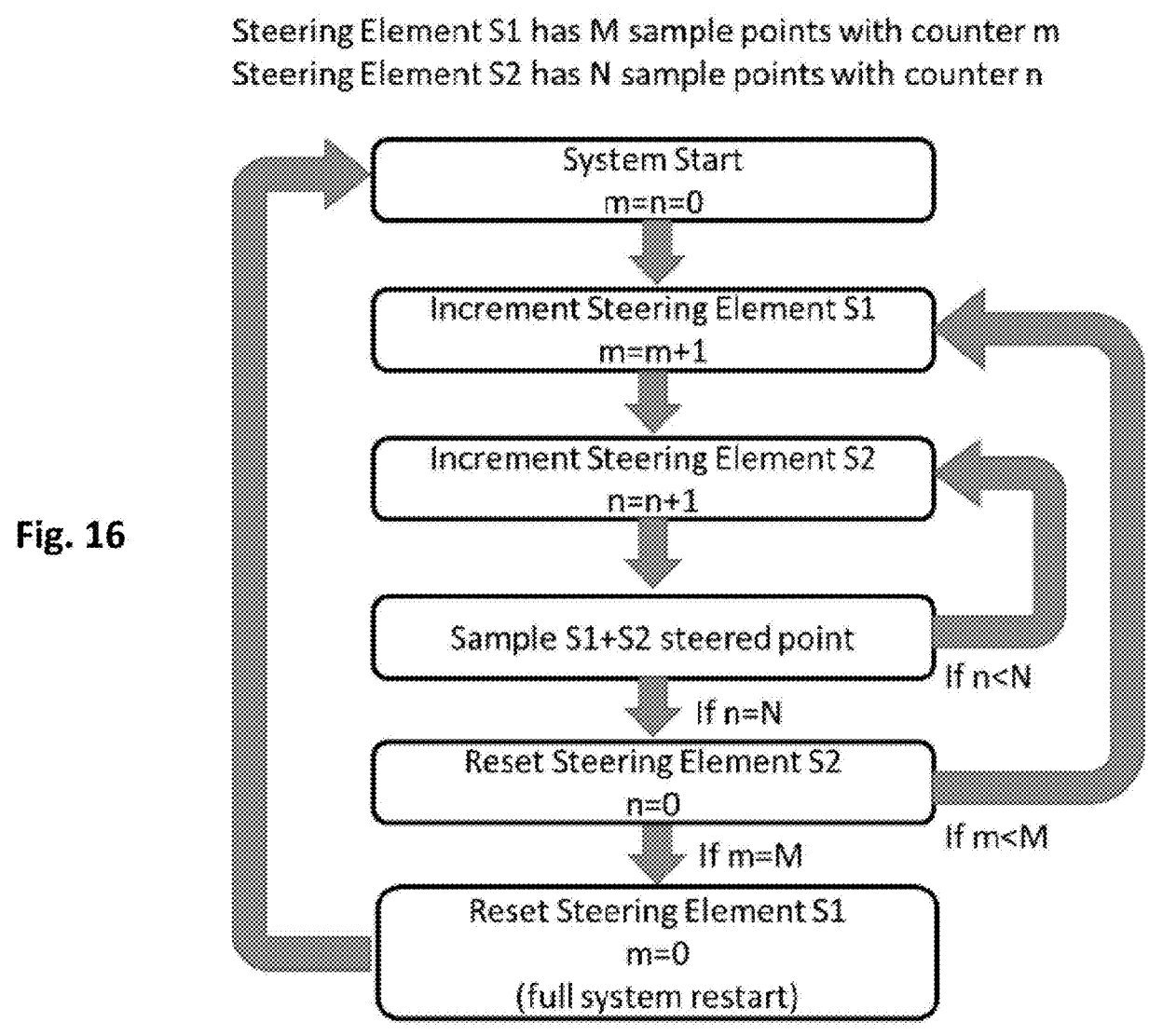

Steering Element S1 has M sample points with counter m
Steering Element S2 has N sample points with counter n System Start
m=n=0

Increment Steering Element S1
m=m+1

Increment Steering Element S2
n=n+1

Sample S1+S2 steered point

If n=N

Reset Steering Element S2
n=0

If n<N

If m=M

Reset Steering Element S1
m=0
(full system restart)

MEMS-BASED HYBRID BEAM STEERING DEVICE FOR LIDAR

CROSS REFERENCE TO RELATED APPLICATIONS

The present application is the U.S. National Stage application of International Application PCT/US19/43969 filed Jul. 29, 2019, which relates and claims priority to U.S. Provisional Application, Ser. No. 62/703,918, filed Jul. 27, 2018, the entirety of each of which is hereby incorporated by reference.

FIELD OF THE INVENTION

The present disclosure is directed generally to LiDAR and more particularly to a MEMS-based hybrid beam steering device.

BACKGROUND

LiDAR is an acronym for Light Detection and Ranging. LiDAR can be used to collect data and provide a map of objects in a particular field of view with one particular application being use in for example autonomous vehicles and robots. One benefit of LiDAR is that it can be collected either during daylight or at night. Once "raw" data has been collected, a series of semi-automated software techniques is used to clean up the data to produce a uniformly spaced set of data points that can then be used to generate accurate terrain and/or surface models. LiDAR output data is typically stored in the industry standard LAS file format. The LAS specification is published the industry consortium known as the American Society for Photogrammetry and Remote Sensing (ASPRS). The current released version of the LAS is 1.4 and contains record formats 0-10.

Typical LAS files contain from 1 million to more than 1.5 billion points. To provide a sense of magnitude for how these numbers relate to file size and data storage requirements, one must consider the parameters used when specifying LiDAR data delivery requirements. LiDAR "collects" or data collection missions are tailored to meet specifications that can be unique to a specific project. Parameters that impact output file sizes include the following: Point Density/Spacing (Refers to the relative spacing between measured points and the total number of points in a given area (typically 1 sq meter)); Multiple Returns (Multiple returns provide information pertaining to the distance to the measured surface and the return signal strength from the reflecting object.); and Pulse rate (Refers to the speed at which the laser emits pulses of light. Higher pulse rates yield increased point density.)

As illustrated in FIG. 1, the basic manner in which LiDAR operates is that a laser beam is pulsed at known times. The laser beam reflects off an object and a detector receives the reflected signal and records the time of the pulse flights. The speed of light and time are used to calculate the object's distance. To take this a step further, as illustrated in FIG. 2, a laser beam is driven to several known angles and pulsed at each. The return signals are recorded with the device's angle and the time it took to return and processing the data creates a depth map with respect to the device.

One problem with current LiDAR technology is that it is not advanced enough to be introduced to the mass public and be challenged by the human condition. Issues with having too narrow a field of view and not being able to map objects at greater distances provides challenging problems that need to be overcome for the technology to become more accepted in more mass consumer applications like autonomous vehicles.

3D mapping tools are necessary in autonomous vehicles for vehicle awareness and obstacle avoidance. As discussed above, Lidar systems are common 3D mapping tools which, unlike many radar- or sonar-based systems, can achieve high (<1°) angular resolution. Long-range lidar systems require sequential beam steering to scan a collimated beam of light across the field-of-view, and/or sequentially steer the receiver's line-of-sight.

Many beam steering techniques rely on large mechanical rotating systems which are bulky and slow and limit frame rate. Other beam steering techniques rely solely on MEMS (Micro-Electro-Mechanical Systems) resonant mirrors for high-speed beam steering, but MEMS resonant mirrors are often limited in output angular extent and have a speed-size tradeoff (high speed and small OR low speed and large). Large beam output diameters are necessary for laser eye safety at commonly used non-eye-safe wavelengths such as 905 nm.

Applicant previously developed a beam steering technique using a Digital Micromirror Device (DMD) to steer a large-diameter beam across a wide field-of-view at 4-50 KHz sample rates (U.S. Provisional Patent Application 62/485,554: International Application No. PCT/US18/27508). The diffractive-based beam steering technique has a large field-of-view (e.g.,) 48° and very low angular resolution (e.g., 6° increments for a total of 8 points).

For background, here are some of the key specs of beam steering systems for lidar:

Field-of-View (1D or 2D angular extent, e.g., 2D: 10°× 50°;

Angular resolution (e.g., 0.33°×0.33° across 10°×50° for 4500 points):

Point-by-point sampling rate (e.g., 50 kHz);

Frame rate (e.g., 50 kHz sampling across 4500 points for 11.1 FPS);

Output beam diameter (e.g., 10 mm).

Accordingly, there is a need in the art for LiDAR to become more compact, have larger fields of view, and detect objects at greater distances, and one that combines a wider field-of-view, lower resolution, "coarse steering element" (e.g., DMD) and a narrower field-of-view, higher resolution "fine steering element" for the result of a wide field-of-view, high resolution, high speed cascaded beam steering system.

SUMMARY

The present disclosure is directed to a MEMS-based hybrid beam steering device used to collect LiDAR data.

According to an aspect is a LiDAR system, comprising: a laser adapted to pulse at a predetermined pulse rate during a predetermined cycle; a MEMS-based scanning mirror positioned to reflect the pulsed laser beams generated by the laser; at least one lens through which the light beam reflected by the MEMS-based mirror passes for creating a collimated beam; a digital micromirror device positioned to receive the collimated beam and adapted to steer it to different locations corresponding to different diffraction orders towards an object to be detected; a photodiode positioned to receive light reflected off of the object to be detected; a programmable amplifier to receive a signal from the photodiode and amplify it; an analog to digital converter for receiving the amplified signal and converting it to a digital signal; a timing chip which is tied to the pulse of the laser and positioned to receive the amplified digital signal from the analog to digital converter and adapted to stop counting concurrent with the receipt of the amplified digital signal and output a signal; and processing device for receiving the output signal of the timing chip and adapted to process calculations based on the signal received and send a signal to the laser to start a new pulse, to the MEMS-based scanning mirror to trigger its angle, and to the timing chip to begin counting, and further configured, structured and/or programmed to provide a control sequence to synchronize timing of movement of said MEMS-based scanning mirror and said digital micro mirror device. The MEMS-mirror and digital micromirror device operates in a synchronous manner for example MEMS-mirror scans narrower angular extent while digital micro-mirror device extends the scan area by duplicating the narrow scan beams over wider diffraction angles.

According to an embodiment, the photodiode is an avalanche photodiode.

According to an embodiment, the photodiode is a multi pixel photon counter (MPPC).

According to an embodiment, pulse duration of the laser is less than 25 nSec at a cycle rate of over 1 KHz.

According to an embodiment, the processing device is an FPGA.

According to an aspect, a cascaded beam steering system, comprises: first and second steering elements, wherein one of the first and second steering elements is a coarse steering element and the other is a fine steering element and each of the first and second steering elements outputs a series of individually selectable beam directions for each input beam angle of incidence; a light source that produces an input beam received by the first steering element at an angle of incidence; and a relay positioned between the first and second steering elements an adapted to direct the individually-selectable outputs from the first steering element onto the second steering element for individually-selectable angles-of-incidence on the second steering element.

According to an embodiment, the source of light is ambient lighting.

According to an embodiment, the source of light is UV light source.

According to an embodiment, the first and second steering elements are transmissive.

According to an embodiment, the first and second steering elements are reflected optical devices.

According to an embodiment, the cascaded beam steering system further comprises a detector positioned to receive a beam output from the second steering element According to an embodiment, wherein the detector comprises light collection optics.

According to an embodiment, the light source comprises beam shaping optics.

According to an embodiment, the second steering element comprises a component that receives light from the relay and transmits a cascaded beam to a field of view and a component that receives light reflected from the field of view.

According to an embodiment, the cascaded beam steering system further comprises collection optics positioned to receive the light output from the component that receives light reflected from the field of view, and a detector positioned to receive light output from the collection optics.

According to an embodiment, the relay comprises a telescope relay adapted to maintain beam collimation but redirect beam directions, with a design-controlled magnification factor According to an embodiment, the fine steering element is selected from the group of: a MEMS mirror, a phase light modulator, a grating light valve, a galvo mirror, a mechanically rotating prism pair, and an amplitude and/or phase spatial light modulator (SLM).

According to an embodiment, wherein the coarse steering element has an angular extent wider than the fine steering element, and angular resolution wider than the fine steering element According to an aspect, a method for incrementing full field scanning of a cascaded beam steering system having first and second steering elements, wherein the first steering element includes a first set of scanning points and a first counter having an initial value of zero, and the second steering element includes a second set of scanning points and a second counter having an initial value of zero, comprises the steps of: (a) incrementing the first steering element by one unit whereby the first counter increases by one unit; (b) incrementing the second steering element by one unit whereby the second counter increases by one unit; (c) sampling the combined steered point of the first and second steering elements; (d) if the second counter is less than the second set of scanning points, then incrementing the second steering element by one unit, whereby the second counter is increased by one from its previous value, until the value of the second counter is equal to the second set of scanning points; (e) once the second counter is equal to the second set of scanning points, then resetting the second counter to zero, and determining if the value of the first counter is less than or equal to the value of the first set of scanning points; (f) if the first counter is less than the value of the first set of scanning points, then repeating steps (b)-(e) above until the value of the first counter equals the value of the first set of scanning points; and (g) once the first counter is equal to the first set of scanning points, then repeating the process from step (a) above.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which:

FIGS. 5A and 5B are a table and graph, respectively, showing an example of FPGA limits, in accordance with an embodiment.

FIG. 6 is a 10×10 raster scan diagram, in accordance with an embodiment.

FIG. 7 is a series of schematics (a) top view of digital micromirror device consists of array of mirrors which tilts predetermined angles, such as −12 (on), 0 (parked), and +12 (off) degrees measured from normal of device. Each of the state of micromirrors are depicted in FIGS. 7(b), (c), and (d), respectively, in accordance with an embodiment.

FIG. 10a, 10b, 10c, an 10d, are cascaded beam steering system diagrams, in accordance with an embodiment.

FIGS. 11a, 11b, and 11c, are cascaded beam steering system diagrams using a relay, in accordance with an embodiment.

FIGS. 14a and 14b are two different raster scanning methods in a cascaded beam steering system, in accordance with an embodiment.

FIG. 15a depicts the population/scanning order when incrementing the Coarse Steering Element, and FIG. 15b shows an interleaving method where the raster of the Fine Steering Element (using the raster method of FIG. 14(b)) is incremented after cycling through all the positions of the Coarse Steering Element, in accordance with an embodiment.

FIG. 16 depicts an incrementing process for full field scanning of a two-steering-element cascaded optical system, in accordance with an embodiment.

DETAILED DESCRIPTION OF EMBODIMENTS

The present disclosure describes a LiDAR system and, more particularly, a MEMS-based hybrid beam steering device for LiDAR.

Figure 8:
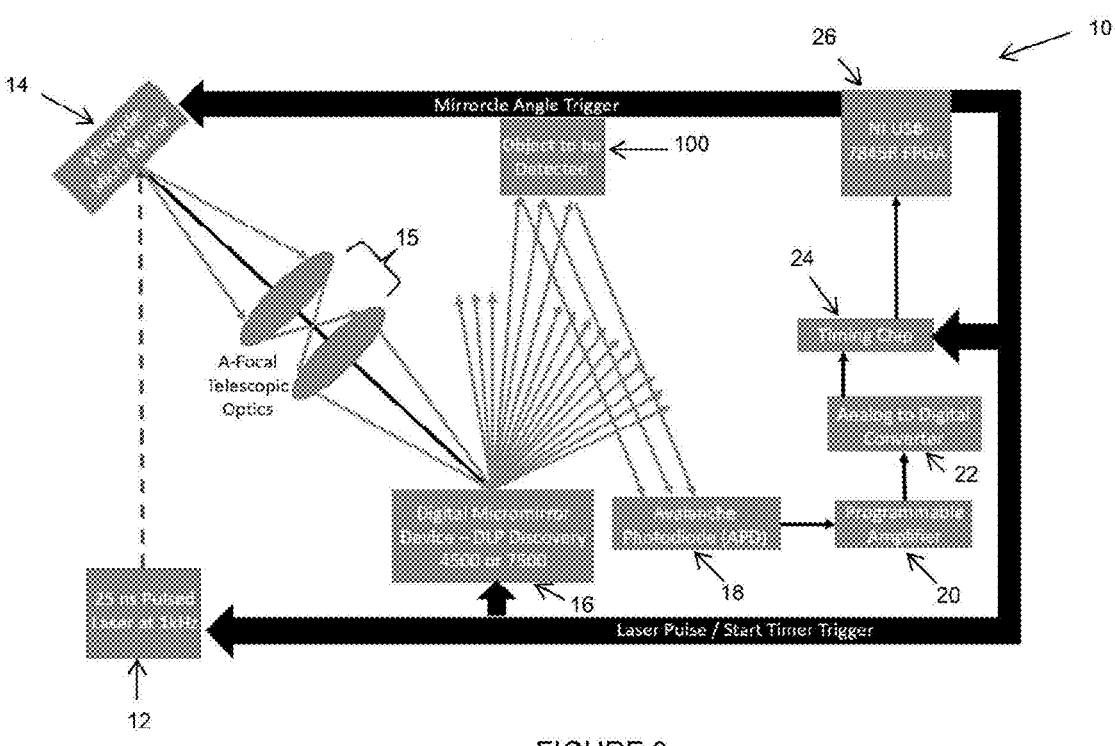
FIG. 8 is a block diagram schematic representation of a LiDAR system, in accordance with an embodiment.

Referring to FIG. 8, in one embodiment, is a LIDAR system, designated generally by reference numeral 10 that is adapted to sense the position of an object of interest 100. LiDAR system 10 generally comprises a pulsed laser 12, that in one embodiment pulses for a duration of 25 nSec at a cycle rate of 1 KHz, a MEMS-based mirror 14 positioned to receive the pulsed laser beam from laser 12, a lens or series of lenses 15 through which the light beam reflected by mirror 14 passes and collimated, a digital micromirror device (DMD) 16 that receives the collimated light beam from lens(es) 15 and reflects and steers the light to different locations at different orders towards the object of interest 100, a photodiode 18 (an avalanche photodiode in one embodiment) that receives light reflected by the object of interest 100 and outputs a digital high signal representative of the received light, an amplifier 20, preferably programmable, that receives the digital high signal from the photodiode (APD) 18 and amplifies the signal and outputs the amplified signal in analog form to an analog to digital converter 22 which, in turn, sends the signal to a timing chip 24 that is tied to the pulse of laser 12 and is programmed, configured and/or structured to stop counting (it was programmed, structured and/or configured to start counting when the laser 12 began pulsing beams of light), and a processing device (e.g., a FPGA, ASIC, configurable processor, etc., referred to simply as a "FPGA" herein) 26 that is positioned to receive the output signal from timing chip 24 and is programmed, structured, and/or configured to perform calculations that determine the position of the object of interest 100.

In reference to FIG. 6, a raster scan by MEMS-mirror 14 (10×10 in the example) is illustrated. The raster scan is where the laser 12 is directed at several points in a line, and then the same set of points a line lower: this is then repeated to create the scan. The MEMS-based mirror 14 uses this raster scan to drive the beam through several unique incident angles on the DMD 16 with lens(es) 15 directing the collimated light on one spot on the DMD 16 regardless of the angle sent by MEMS-based mirror 14.

The DMD 16 takes the incident laser pulses and steers them to different locations corresponding to different orders. The DMD 16 can be treated as a Blazed Grating due to the laser pulses being faster than the transition time between on/off for the DMD. This allows the laser to be pulsed at 8 different angles for example at a wavelength of 905 nm during the DMD's transition. During each angle the raster scan occurs creating a finer resolution scan between the different orders.

The laser is incident upon an object 100 and reflected in to the APD 18. The APD 18 detects the light pulse and creates an analog response, but it is too small for the AD converter to detect and must pass through the programmable amplifier 20. After being amplified, the analog signal can be converted to a digital signal which then triggers the timing chip 24, which is tied to the pulse of the laser, to stop counting. The output of the timing chip 24 is then sent to the FPGA 26 where calculations can be done and the system will send another pulse after completion.

Figure 9:
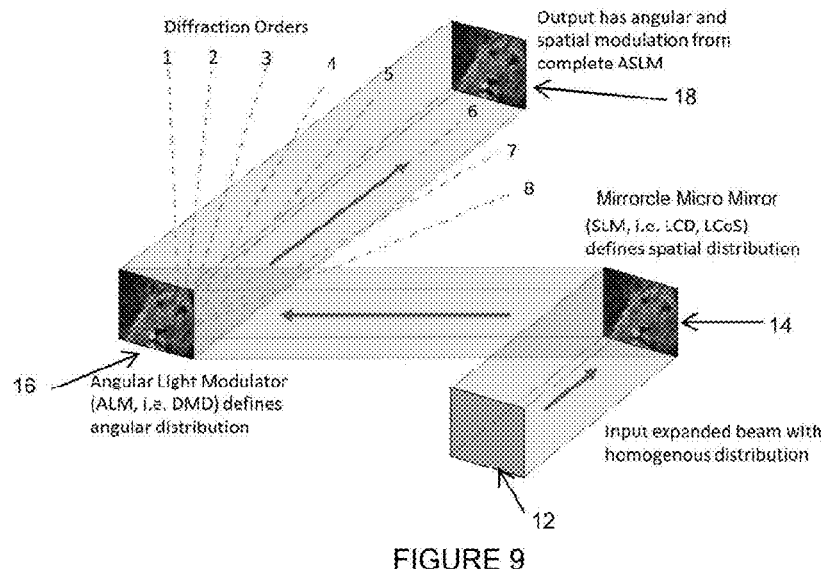
FIG. 9 is a block diagram schematic representation of a LiDAR system, in accordance with an embodiment.

LiDAR system 10 can be summarized with reference to FIG. 9. Laser 12 provides an input beam expanded with homogenous distribution. The light is then spatially and/or angulary modulated using the MEMS-based scanning mirror 14. The light is then angularly modulated by the DMD 16 and spread across different diffraction orders. The photodiode then receives the light reflected off the object of interest and the FPGA processes data and performs calculations and provides a control sequence to synchronize timing of movement of said MEMS-based scanning mirror and said digital micro mirror device.

An embodiment, as shown in FIGS. 10a-10d provides a cascaded beam steering system 100 with a primary application of lidar. A lidar system is generally comprised of two optical systems (which may or may not share optical elements): a transmitter and a receiver. The cascaded beam steering system 100 can be implemented as either the transmitter or the receiver or both with shared or non-shared elements. More broadly, the cascaded beam steering system 100 has the effect of a rotating mirror which changes a line-of-sight of optics and does not have to be used for lidar. For instance, the cascaded beam steering system 100 can be used with a detector and only ambient lighting (not a system-controlled light source) for a single-pixel camera implementation, or the cascaded beam steering system 100 can be used with a UV light source for 3D printing in a UV-curing medium.

The cascaded beam steering system 100 is comprised of two cascaded steering elements 102. Each steering element's 102 outputs a series of individually-selectable beam directions for each input beam angle-of-incidence.

The steering elements 102 of FIGS. 10(*a*)-10(*d*) are shown as transmissive, though the steering elements can also be reflected optical devices.

FIG. 10(*a*) shows a Coarse Steering Element 102 having a light input 101 with outputs 104 of angular extent θ and angular resolution Δθ (angular spacing between discrete sampling points). A set of output directions are shown, but only one direction is selected by the coarse steering element at a single moment (sequentially scanned). The coarse steering element 102 may be ID or 2D steering, but for a purpose of illustrating functionality, only a single dimension of steering is depicted.

FIG. 10(*b*) shows the same Coarse Steering Element 102 and output 104 in black as depicted in FIG. 10(*a*). A second input 106 in orange with angular offset of Δφ is shown with a corresponding orange set of outputs 108. Each individual output 108 direction is offset by Δφ with respect to the original output 104 set of directions. This demonstrates how the set of output directions are dependent on the input angle-of-incidence. FIG. 10(*b*) is depicted such that Δφ<Δθ.

FIG. 10(*c*) shows a Fine Steering Element 110, similar to 10(*a*), but with angular extent φ and angular increment/ resolution Δφ. In general, φ<θ and Δφ<Δθ.

FIG. 10(*d*) shows a Fine Steering Element 110 with two different inputs 114, 116 at different angles-of-incidence, similar to FIG. 10(*b*), but separated by Δθ. The set of outputs 108 is offset by Δθ. The depicted case of FIG. 10(*d*) shows Δθ≈φ, allowing the discrete, relatively-equally-spaced outputs of FIG. 10(*c*) to be continued into output 108 directions.

In general, FIGS. 10(*a*)-10(*d*) depicts beams of light propagating, though individual beams may be collimated or diverging or converging. Many lidar systems prefer the final output to be relatively collimated. A set of outputs (104 and 108) are shown for each steering element, though only a single direction/point (i.e., angular-space point/coordinate) is steered at a single time. The inputs (101 and 106) correspond with outputs (101 and 106, respectively) represent different sets of selectable output directions corresponding to different input angles-of-incidence.

The overall concept of the cascaded beam steering system is to cascade a Coarse Steering Element 102 with a Fine Steering Element 110 to overall achieve the greater angular extent of the Coarse Steering Element 102 with the finer resolution of the Fine Steering Element 110. This is achieved by cascading the elements with a relay 120. One type of relay 120 is a telescope relay which maintains beam collimation but redirects beam directions, with a design-controlled magnification factor, as depicted in FIGS. 11(*a*)-11 (*c*). However, in general, the beams throughout may be collimated or not, though it will often be preferred that the final output is collimated. The purpose of the relay 120 is to direct the individually-selectable outputs from the first steering element onto the second steering element for individually-selectable angles-of-incidence on the second steering element. The Fine Steering Element 110 and the Coarse Steering Element 102 are each assigned a "Position Number", P1 or P2.

FIG. 11(*a*) shows a 1:1 relay 120. A beam is input into Steering Element P1 102/110 with a set of output directions shown (single direction steered at one time). The output set from Steering Element P1 102/110 propagates through the 1:1 relay 120 (no magnification) such that the set of beams converge onto Steering Element P2 102/110 with the same angular extent as the initial set of outputs from Steering Element P1 102/110. The beam diameters are also the same. The beams may or may not be collimated.

FIG. 11(*b*) is the same as FIG. 11(*a*), but the relay 120 has magnification m, reducing the angular extent of the outputs from Steering Element P1 102/110 to Steering Element P2 102/110 and increasing the diameter of each beam.

FIG. 11(*c*) is the same as FIG. 11(*a*), but the input beam diameter is larger and the angular extent of Steering Element P1 102/110 is smaller. The relay 120 has magnification 1/m, increasing the angular extent of the outputs from Steering Element P1 102/110 to Steering Element P2 102/110 and reducing the diameter of each beam.

Figure 1:
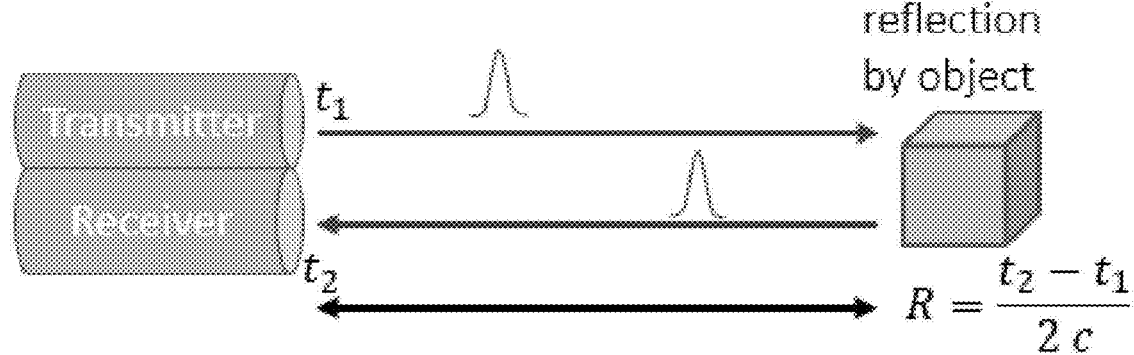
FIG. 1 is a prior art schematic representation of a LiDAR.
Figure 2:
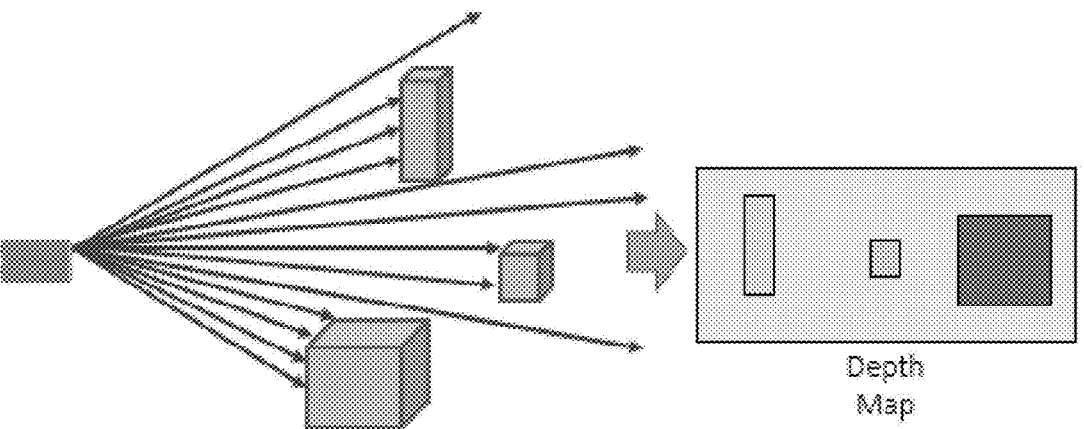
FIG. 2 is a prior art schematic representation of a LiDAR
Figure 3:
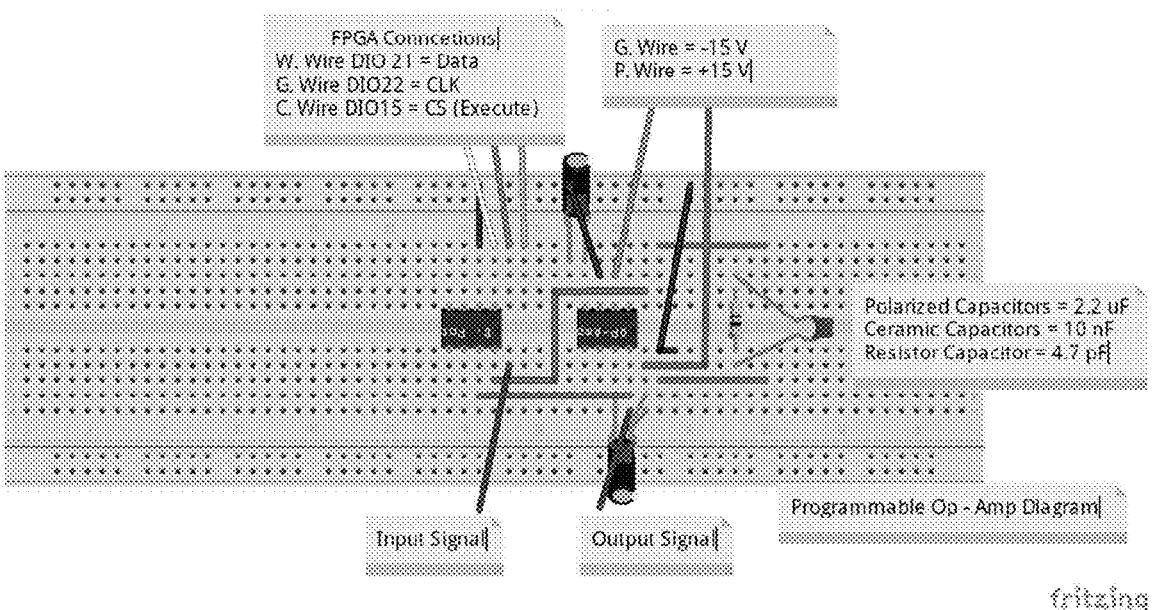
FIG. 3 is a schematic representation of an operational amplifier, in accordance with an embodiment.
Figure 4:
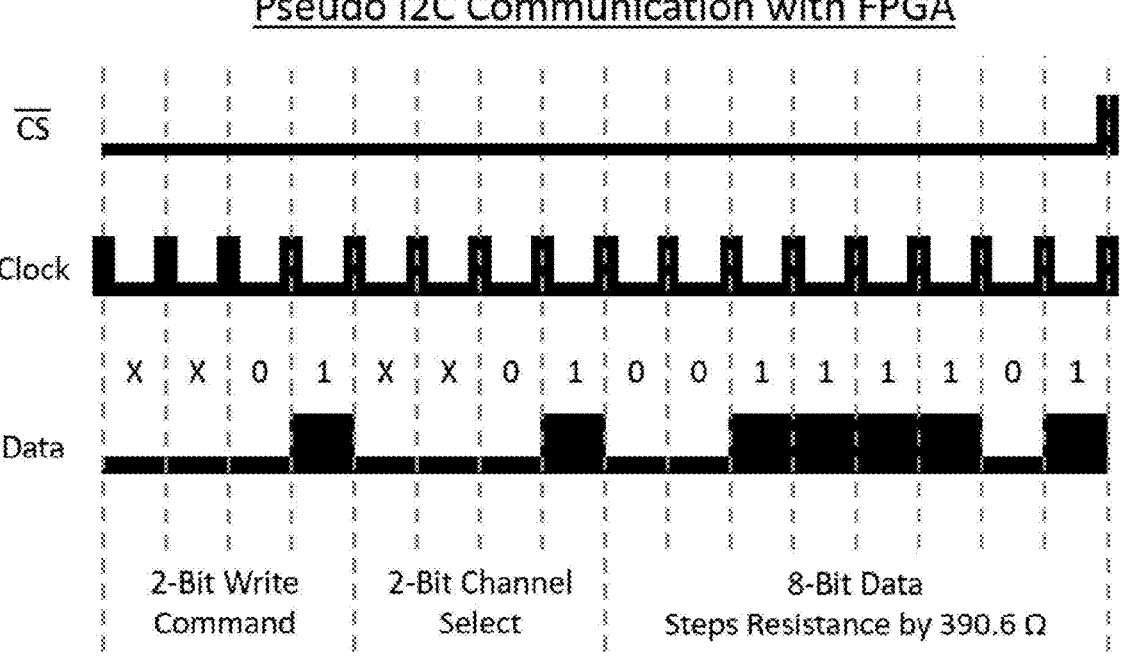
FIG. 4 is a timing diagram, in accordance with an embodiment.

The cascading order (whether the Coarse Steering Element 102 is first at P1 or second at P2) is selected based on a couple figures of merit. First, the Coarse Steering Element 102 may have a larger active area which could support a large beam diameter (as is the case with a DMD as the Coarse Steering Element and a MEMS resonant mirror as the Fine Steering Element), so a relay could be used to expand the beam after the Fine Steering Element as shown in FIG. 2(*b*). A larger output beam diameter may be preferred for eye safety especially for lidar applications. Second, if either the Fine Steering Element 110 or the Coarse Steering Element 102 has unwanted additional outputs (e.g., ghost reflections, higher-order diffraction orders, too many or too wide of sample points, etc) then placing that steering element at P1 would allow a spatial filter to be implemented, for example at a Fourier plane of 4F-relay system, within the relay to filter out the unwanted beam directions (rather than using additional optics after P2).

The output directions of the overall cascaded beam steering system are depicted in FIGS. 12(*a*)-12(*c*).

FIG. 12(*a*) shows a set of output directions/points individually selectable by a Fine Steering Element 110.

FIG. 12(*b*) shows a set of output directions/points individually selectable by a Coarse Steering Element 102. The Coarse Steering Element 102 of FIG. 12(*b*) is scannable in one dimension. The different point size is irrelevant (only to make reader view easier).

When the two steering elements are cascaded (order of Fine vs Coarse first does not matter), the first steering element selects angle-of-incidence for the second steering element, and the second steering element proceeds to select the overall output direction among the angle-of-incidence-dependent set of output directions. (i.e., in FIG. 10(*d*), Coarse Steering Element selects b vs. a angle-of-incidence (e.g., b), and then the Fine Steering Element selects one of the corresponding output directions (e.g., top-most b output).

FIG. 12(*c*) shows the output from cascaded beam steering system comprised of a Coarse Steering Element 102 and Fine Steering Element 110 (same output for Coarse first or Fine first). It should be noted that the output from the Fine Steering Element 110 of FIG. 12(*a*) is repeated, where each repetition is repeated at each of the Coarse Steering Element's output locations. In this particular setup, the angular extent of the Fine Steering Element 110 is matched to the angular resolution (spacing) of the Coarse Steering Element so as to prevent large gaps or overlapping areas in the sampling space. The plots are in angular-space.

FIGS. 13(*a*)-13(*c*) are the same as FIGS. 12(*a*)-12(*c*), but a 2D Coarse Steering Element is used in 13(*b*) and 13(*c*). Cascaded steering element order does not matter to create the outputs of 13(*c*).

Each steering element has an incrementing order. For instance, a 1D steering element could simply sweep side-to-side. A 2D scan by a two-axis rotating mirror is commonly referred to as a raster scan, as depicted in FIG. 14.

FIGS. 14(*a*) and 14(*b*) show two different raster scanning methods (point scanning orders) for a 2D steering element. Other raster scan methods exist, and the exact raster scanning order (14 (*a*) vs. 14(*b*)) does not matter for this invention.

A cascaded scanning order must be determined to scan through all of the combined output points (e.g., FIG. 12(*c*)). Two cascaded scanning orders are depicted in FIGS. 15(*a*) and 15(*b*).

FIGS. 15(*a*) and 15(*b*) show two different cascaded sampling orders for a system of cascaded Fine Steering Element and Coarse Steering Element. As an example, the Coarse Steering Element 102 used for 15(*a*) and 15(*b*) has 1D steering across 3 points. The Fine Steering Element 110 used for 15(*a*) and 15(*b*) has 2D steering across a 3×3 array of points. The physical cascading order does not matter to create 15(*a*) or 15(*b*) (Fine Steering Element 110 or Coarse Steering Element 102 can be positioned first in the optical system). The numbers at the top of the figures show the Coarse Steering Element's position number. The small numbers in the square grid show the overall population order.

FIG. 15(*a*) depicts the population/scanning order when incrementing the Coarse Steering Element 102 once and then completing a full raster on the Fine Steering Element 110 (using the raster method of FIG. 14(*b*)) per Coarse Steering Element direction/point. This method is named "straight scanning order".

FIG. 15(*b*) shows an interleaving method where the raster of the Fine Steering Element 110 (using the raster method of FIG. 14(*b*)) is incremented after cycling through all the positions of the Coarse Steering Element 102. The method is named "interleaved scanning order".

FIG. 16 depicts an incrementing process for full field scanning of a two-steering-element cascaded optical system. This would be implemented into software in a manner understood by one of ordinary skill in the art to control the individual steering elements. Each steering element is assigned a "Software Number", S1 or S2.

FIG. 15(*a*), depicting "straight scanning order", is the result of assigning the Coarse Steering Element 102 to Steering Element S1 in FIG. 16 and assigning the Fine Steering Element 110 to Steering Element S2 in FIG. 16.

FIG. 15(*b*), depicting "interleaved scanning order", is the result of assigning the Coarse Steering Element 102 to Steering Element S2 in FIG. 16 and assigning the Fine Steering Element 110 to Steering Element S1 in FIG. 16.

The selection of "straight scanning order" vs. "interleaved scanning order" is based on a couple points of merit. First, the selection of scanning order dictates the overall sampling rate limit given that each steering element has an independent sampling rate limit. For instance, if the Coarse Steering Element 102 has a max increment rate that is significantly greater than the that of the Fine Steering Element 110, the overall system sampling rate might be greater if the "interleaved scanning order" is used. Second, there may be a benefit to scanning the entire field section by section (in the case of "straight scanning order") or sampling the entire field more uniformly over time (in the case of "interleaved scanning order") depending on the application.

A Fine Steering Element 110 could be, but is not limited to, a MEMS mirror (resonant or non-resonant), a phase light modulator, a grating light valve, a galvo mirror, a mechanically rotating prism pair, or an amplitude and/or phase spatial light modulator (SLM) such as LCOS, DMD, or LCD creating fine-steering holograms.

A Coarse Steering Element 102 has an angular extent wider than the Fine Steering Element, and angular resolution wider than the Fine Steering Element. One basis of the present technology is using a Digital Micromirror Device in a beam steering setup, particularly the diffraction-based discrete beam steering technique, of Applicant's previous technology disclosed in U.S. Provisional Application Ser. No. 62/485,554, International Application No. PCT/US18/27508. While the prior applications concerned the DMD-based beam steering technology, presently the focus is on other Fine-Coarse cascaded beam steering prior art, hence the use of "Fine Steering Element" and "Coarse Steering Element".

It should be noted that some beam steering elements have continuous steering (e.g., rotating mirror) and some steering elements have inherently discrete (i.e., segmented, stepping, non-continuous) output directions (e.g., diffraction based DMD beam steering). However, pulsed illumination of a continuously rotating mirror at discrete intervals has the effect of discretized output directions despite the continuous rotation of the mirror.

It should also be noted that there is limited benefit in cascading a Fine Steering Element 110 with a Coarse Steering Element 102 if the Fine Steering Element 110 has an angular extent greater than the Coarse Steering Element 102. However, if the Fine Steering Element device is run at a smaller angular extent, for the benefit of speed (e.g., sampling rate or frame rate), then the Fine Steering Element 110 can be cascaded with the Coarse Steering Element 102 for the benefits of an increase in the angular extent (beyond the reduced angular extent of the Fine Steering Element) and a speed increase (beyond the slower rate of the Fine Steering Element run at its full angular extent).

The following figures and descriptions show possible embodiments of the cascaded beam steering system. It is assumed that the steering elements maintain the single beam direction selectivity and angle-of-incidence dependence of FIGS. 10(*a*)-10(*d*), though the following figures do not depict all the beam steering options/directions.

FIGS. 17(*a*) and 17(*b*) each depicts a scanning transmitter 125 with a light source 130 and the cascaded beam steering system 100. In either FIG. 17(*a*) or 17(*b*), either the Fine Steering Element 110 or the Coarse Steering Element 102 can be assigned to S1 (and the other for S2), in the software sequence of FIG. 16. To reiterate, the software implementation (selection of devices for S1 and S2, dictating overall system sample rate limit) is independent of physical position (selection of devices for P1 and P2, for instance dictating overall system output beam diameter limit).

FIG. 17(*a*) has the Coarse Steering Element 102 in steering element position P1 and the Fine Steering Element 110 in steering element position P2.

FIG. 17(*b*) has the Fine Steering Element 110 in steering element position P1 and the Coarse Steering Element 102 in steering element position P2.

The cascaded beam steering system 100 is equivalently a line-of-sight steering system. That is, rather than using the beam steering system as a transmitter with an illumination source to emit into a series of directions, the beam steering system can be used as a receiver with external illumination sources across a series of locations in the field of view; and the cascaded beam steering system sequentially directs light from each direction onto a detector or detector array. The same Fine Steering Element and/or Coarse Steering Element can also be used for both the transmitter and the receiver.

Figures 17A, 17B, 18:
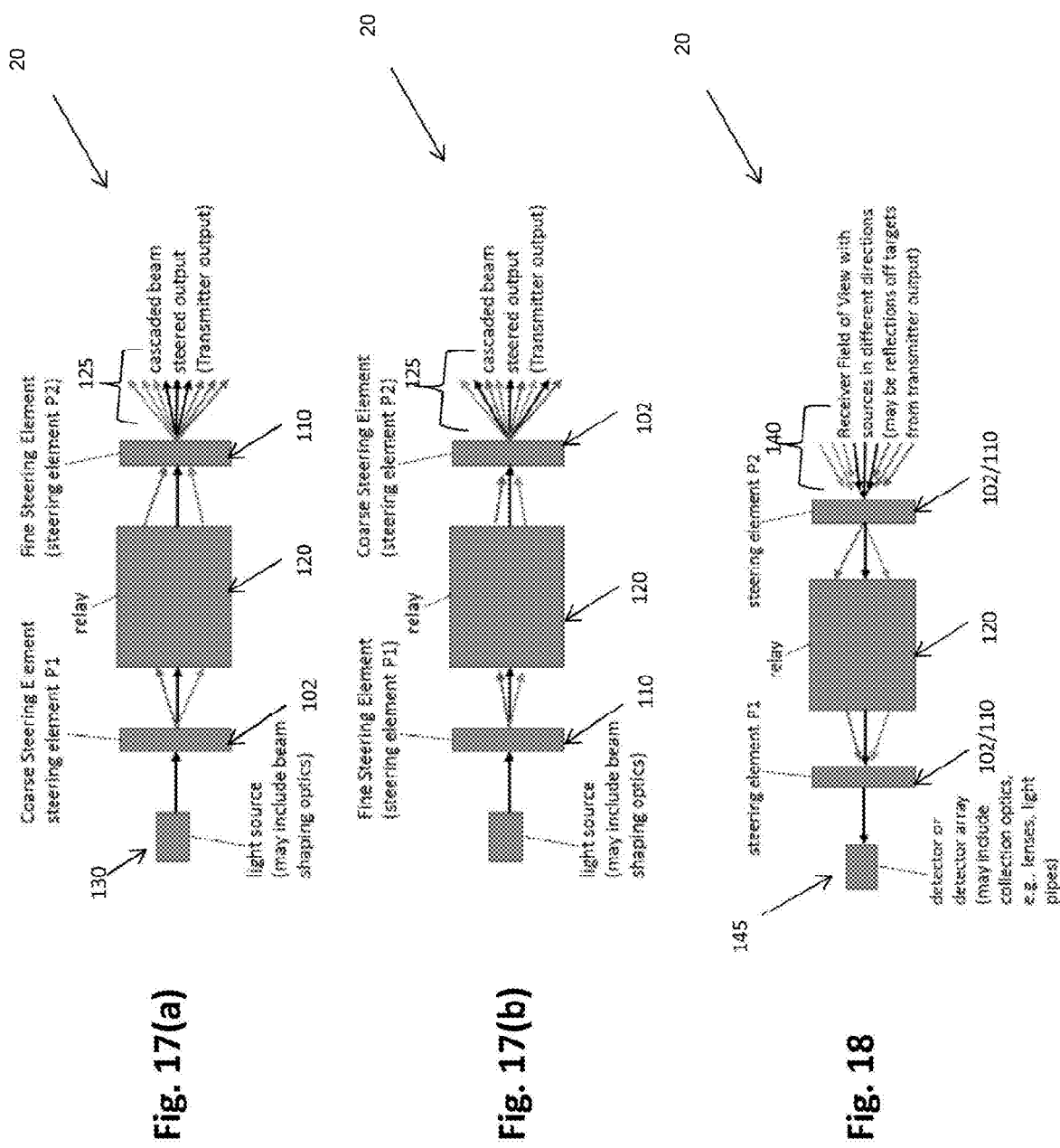
FIGS. 17(a) and 17(b) each depicts a scanning transmitter with a light source and the cascaded beam steering system, in accordance with an embodiment.
FIG. 18 shows the cascaded beam steering system incorporated into a receiver with a detector or detector array where the detector or detector array receives light from one direction at a time, in accordance with an embodiment.

FIG. 18 shows the cascaded beam steering system 100 incorporated into a receiver 140 with a detector 145 or detector array where the detector or detector array receives light from one direction at a time. Again, the beam steering element position order (Fine vs. Coarse) doesn't matter (Coarse in P1 is shown).

Figures 19, 20:
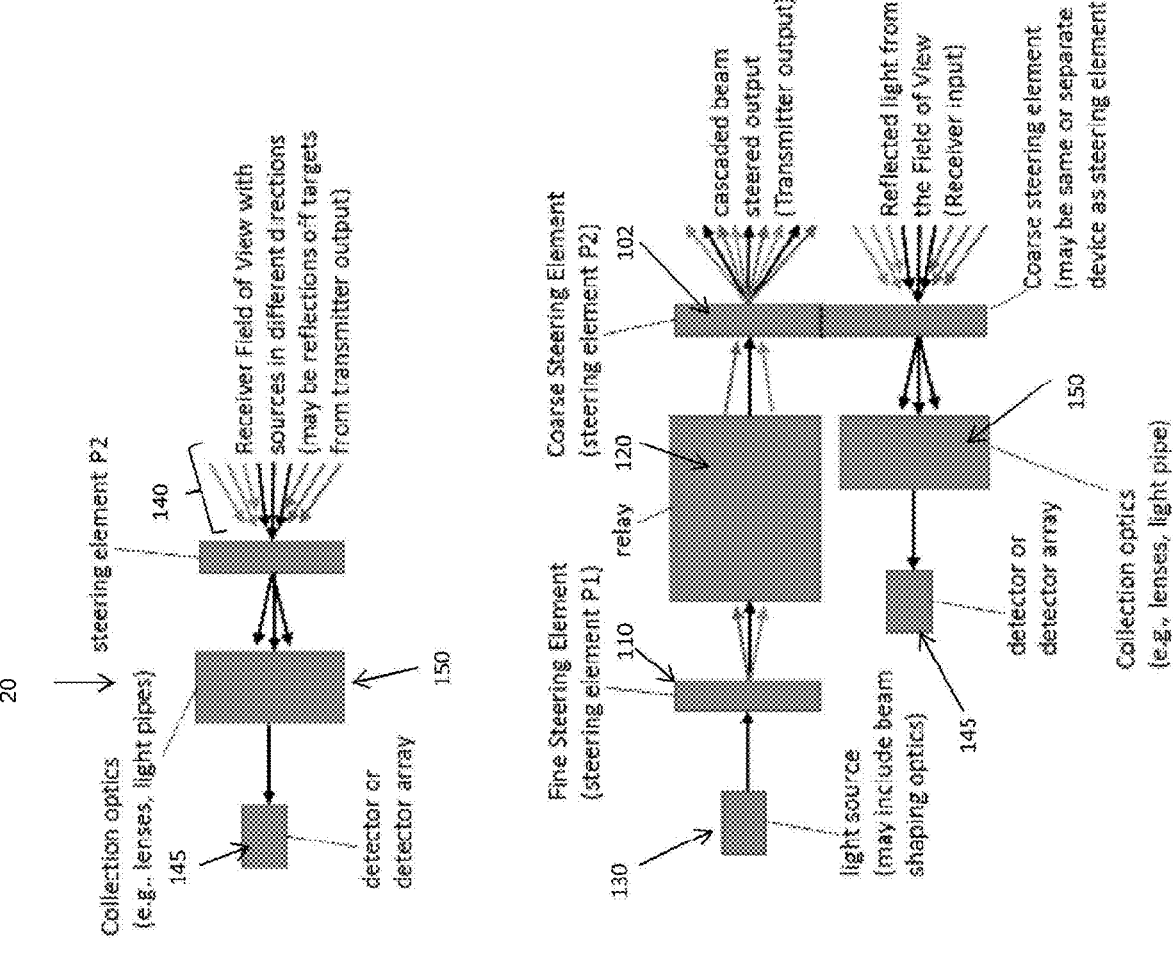
FIG. 19 is a schematic of this non-cascaded, single-beam-steering-element, in accordance with an embodiment.
FIG. 20 is a schematic of a cascaded beam steering system with a transmitter and receiver system, in accordance with an embodiment.

If only the Coarse Steering Element (DMD in particular) is used for the receiver without a Fine Steering Element, additional collection optics 150 can expand the single-moment field-of-view to collect a larger section of the field of view onto a detector or detector array. For clarification, a schematic of this non-cascaded, single-beam-steering-element is shown in FIG. 19. However, this receiver setup using only a single beam steering element does not use the current cascaded beam steering technology.

The cascaded beam steering transmitter of FIG. 17(b) can be combined with the non-cascaded receiver system of FIG. 19, where the steering element P2 of each FIGS. 17(b) and 19 may be the same device (e.g., transmitting and receiving beams each use separate area on beam steering element) or separate devices (e.g., two separate DMDs facing the same direction). This transmitter and receiver system is shown in FIG. 20. Controlling electronics for laser pulsing, beam steering, and range-finding not shown.

To explain FIG. 20 in other terms: just a single steering element (e.g., Coarse Steering Element for full field-of-view) can be physically shared while the other steering element (e.g., Fine Steering Element) in the receiver is replaced by other means such as additional collection optics (creating a larger acceptance angle and/or aperture for the detector) as shown in FIG. 19.

Figures 21, 22:
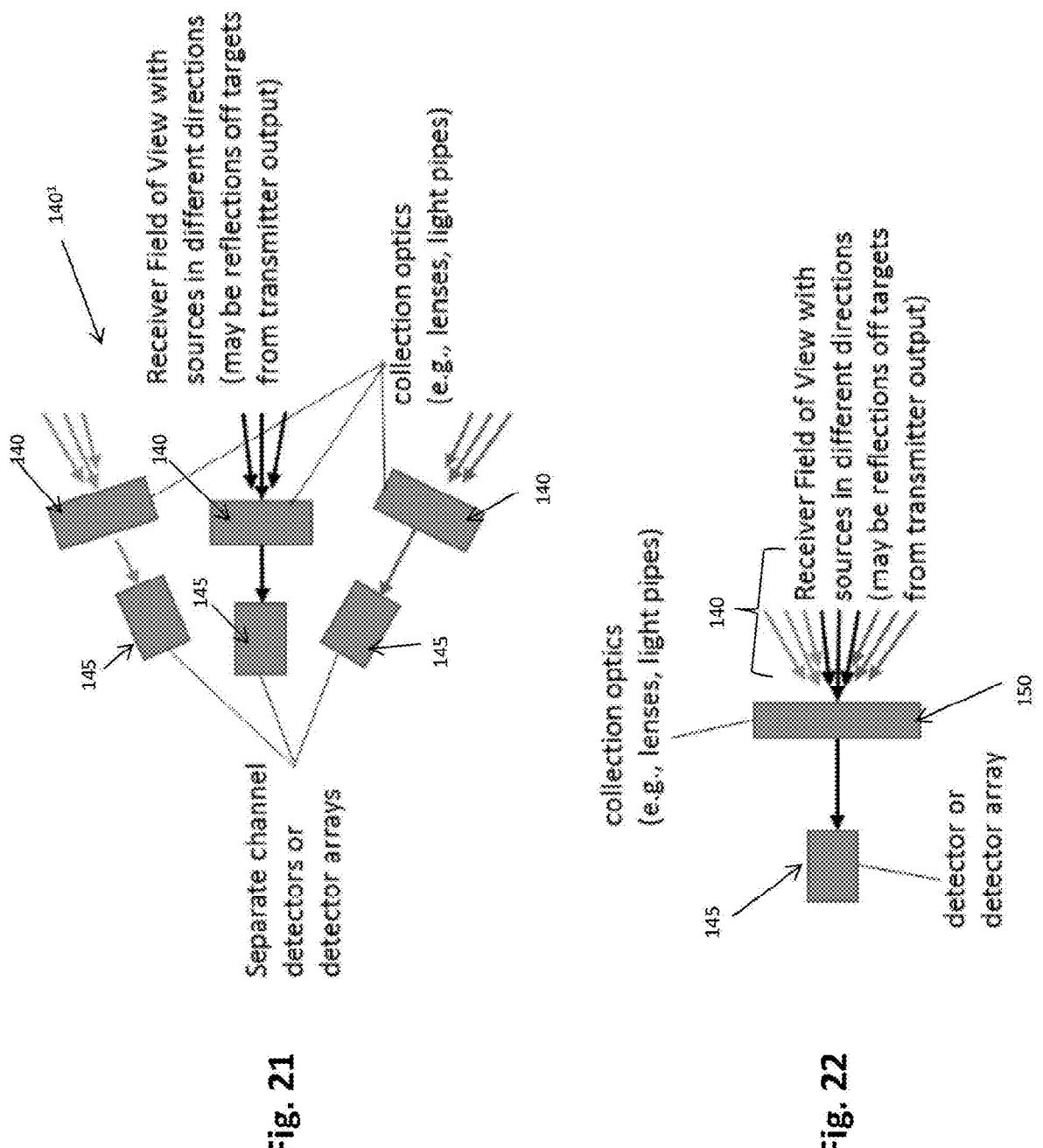
FIG. 21 shows a three-channel receiver where each receiver is receiving light from a different segment of a field of view, in accordance with an embodiment.
FIG. 22 shows a wide field-of-view receiver in which optics collects light from the entire field-of-view onto a detector without scanning, in accordance with an embodiment.

Additionally, a cascaded beam steering system may be paired with non-beam-steering receivers. FIGS. 21 and 22 show examples of non-beam-steering receivers (or transmitters if detectors are replaced with light sources and beam propagations are reversed).

FIG. 21 shows a three-channel receiver 140' where each receiver 140 is receiving light from a different segment of a field of view (collecting light coming from different directions).

FIG. 22 shows a wide field-of-view receiver in which optics collect light from the entire field-of-view onto a detector without scanning.

The cascaded beam steering system does not have to be used in a lidar application (i.e., range finding), but rather any application that requires beam steering.

Figures 12A, 12B, 12C, 13A, 13B, 13C:
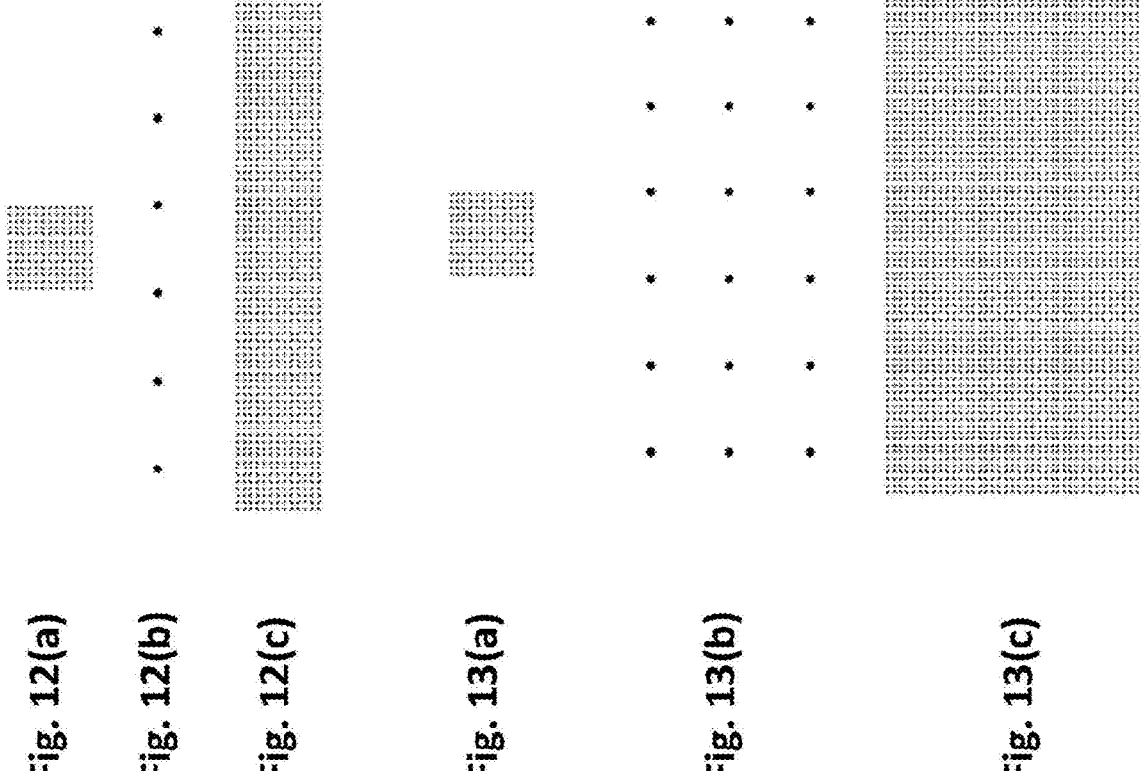
FIGS. 12a, 12b, and 12c, are cascaded beam steering system diagrams showing the output directions, in accordance with an embodiment.
FIGS. 13a, 13b, and 13c, are cascaded beam steering system diagrams showing the output directions, in accordance with an embodiment.

A DMD is a type of 1D Coarse Steering Element (e.g., output of FIG. 12(b)). If two DMDs were cascaded with a 90° offset in roll rotation, likely with a relay between, then the combination of the two DMDs would result in a 2D Coarse Steering Element (e.g., output of FIG. 13(b)). The 2D Coarse Steering Element could then be used to create a Coarse-Fine cascaded beam steering system.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. A LiDAR system, comprising:
   a. a laser adapted to pulse at a predetermined pulse rate during a predetermined cycle;
   b. a MEMS-based scanning mirror positioned to reflect the pulsed laser beam generated by said laser;
   c. at least one lens through which the pulsed laser beam reflected by the MEMS-based mirror passes for creating a collimated beam;
   d. a digital micromirror device positioned to receive the collimated beam and adapted to steer it to different locations corresponding to different orders towards an object to be detected;
   e. a photodiode positioned to receive light reflected off of the object to be detected;
   f. a programmable amplifier to receive a signal from said photodiode and amplify it;
   g. an analog to digital converter for receiving the amplified signal and converting it to a digital signal;
   h. a timing chip which is tied to the pulse of said laser and positioned to receive the amplified digital signal from said analog to digital converter and adapted to stop counting concurrent with the receipt of the amplified digital signal and output a signal; and
   i. a processing device for receiving the output signal of said timing chip and adapted to process calculations based on the signal received and send a signal to the laser to start a new pulse, to the MEMS-based mirror to trigger its angle, and to the timing chip to begin counting, and further configured, structured and/or programmed to provide a control sequence to synchronize timing of movement of said MEMS-based scanning mirror and said digital micro mirror device.

2. The LiDAR system of claim 1, wherein said photodiode is an avalanche photodiode.

3. The LiDAR system of claim 1, wherein the predetermined pulse duration of the laser is 25 nSec or less at a cycle rate of over 1 KHz.

4. The LiDAR system of claim 1, wherein the processing device is an FPGA.

5. A cascaded beam steering system, comprising:
   a. first and second steering elements, wherein one of the first and second steering elements is a coarse steering element and the other is a fine steering element and each of the first and second steering elements outputs a series of individually selectable beam directions for each input beam angle of incidence, wherein the fine steering element is selected from the group consisting of a MEMS mirror and a phase spatial light modulator and wherein the coarse steering element is a digital micromirror device;

b. a light source that produces an input beam received by the first steering element at an angle of incidence; and c. a relay positioned between the first and second steering elements and adapted to direct the individually-selectable beam directions from the first steering element onto the second steering element for individually-selectable angles-of-incidence on the second steering element.

6. The cascaded beam steering system according to claim 5, wherein the light source is ambient lighting.

7. The cascaded beam steering system according to claim 5, wherein the light source is a UV light source.

8. The cascaded beam steering system according to claim 5, wherein the first and second steering elements are transmissive.

9. The cascaded beam steering system according to claim 5, wherein the first and second steering elements are reflected optical devices.

10. The cascaded beam steering system according to claim 5, further comprising a detector positioned to receive a beam output from the second steering element.

11. The cascaded beam steering system according to claim 10, wherein the detector comprises light collection optics.

12. The cascaded beam steering system according to claim 5, wherein the light source comprises beam shaping optics.

13. The cascaded beam steering system according to claim 5, wherein the second steering element comprises a component that receives light from the relay and transmits a cascaded beam to a field of view and a component that receives light reflected from the field of view.

14. The cascaded beam steering system according to claim 13, further comprising collection optics positioned to receive the light output from the component that receives light reflected from the field of view, and a detector positioned to receive light output from the collection optics.

15. The cascaded beam steering system according to claim 5, wherein the relay comprises a telescope relay adapted to maintain beam collimation but redirect beam directions, with a design-controlled magnification factor.

16. The cascaded beam steering system according to claim 5, wherein the fine steering element is selected from the group of: a MEMS mirror, a phase light modulator, a grating light valve, a galvo mirror, a mechanically rotating prism pair, and an amplitude and/or phase spatial light modulator (SLM).

17. The cascaded beam steering system according to claim 5, wherein the coarse steering element has an angular extent wider than the fine steering element, and angular resolution wider than the fine steering element.

* * * * *